US006556511B1

(12) United States Patent
Welke

(10) Patent No.: US 6,556,511 B1
(45) Date of Patent: Apr. 29, 2003

(54) METHOD OF LOCKING ONTO AND TRACKING A TARGET

(75) Inventor: James M. Welke, Ferndale, MI (US)

(73) Assignee: Techno Research, Auburn Hills, MI (US)

( * ) Notice: Subject to any disclaimer, the term of this patent is extended or adjusted under 35 U.S.C. 154(b) by 0 days.

(21) Appl. No.: 10/000,849

(22) Filed: Nov. 1, 2001

(51) Int. Cl.⁷ ................................................ G01S 15/88
(52) U.S. Cl. ............................ 367/98; 367/99; 367/908
(58) Field of Search .............................. 367/87, 97, 98, 367/99, 908

(56) References Cited

U.S. PATENT DOCUMENTS

| 4,315,325 A | * | 2/1982 | Blades .......................... 367/98 |
| 5,131,271 A | | 7/1992 | Haynes et al. |
| 5,157,639 A | | 10/1992 | Leszczynski |
| 5,511,041 A | | 4/1996 | Michalski |
| 5,587,969 A | | 12/1996 | Kroemer et al. |
| 5,734,346 A | * | 3/1998 | Richardson et al. ........ 367/908 |

* cited by examiner

Primary Examiner—Ian J. Lobo
(74) Attorney, Agent, or Firm—King & Joranovic, PLC

(57) ABSTRACT

A method of tracking an object comprising the steps of acquiring the position of at least one object; selecting the at least one object as a target; determining a sampling window which envelopes the target; obtaining an echo; repeating the foregoing step of obtaining an echo a predetermined number of times; determining valid echoes from the target; calculating the current position of the target from the received echoes; and repeating the steps of obtaining, repeating, determining, and calculating as desired. The step of obtaining an echo comprises the steps of transmitting a pulse at a desired frequency from a transducer; scanning for echoes within the sampling window by a receiver; and receiving at least one echo of the pulse at the receiver which are within the sampling window, the at least one echo having a frequency that matches the outgoing pulse frequency.

16 Claims, 2 Drawing Sheets

METHOD OF LOCKING ONTO AND TRACKING A TARGET

BACKGROUND OF THE INVENTION

1. Field of the Invention

This invention is directed primarily to the tracking of objects (targets), and more particularly, to an apparatus and method of locking onto and tracking objects. While not limited thereto, the invention is well suited to the tracking of fluid levels (i.e. the top surface of a fluid) within a container, such as a container or tank of fuel.

2. Background Art

Ultrasonic measurement has long been used in the art to track various objects, such as the top surface of a fluid within a tank. Various prior art designs are known in the art, including U.S. Pat. No. 5,511,041; U.S. Pat. No. 5,587,969; U.S. Pat. No. 5,157,639; and U.S. Pat. No. 5,131,271. While the above-identified references address various different issues relative to ultrasonic measurements, they remain problematic for a plurality of reasons. For example, many of the disclosed apparatuses and methods are not particularly well suited to the tracking of rapidly moving targets, such as fluid within a moving container (i.e. fuel in the tank of a moving vehicle). Moreover, others are not particularly well suited to the tracking of fluid levels when the fluid or the area proximate the fluid includes obstructions therein (i.e. material floating on or in the fluid).

Therefore, one object of the present invention is to facilitate the tracking of moving targets, particularly rapidly moving targets.

It is another object of the present invention to facilitate the tracking of moving targets which include obstructions within or near the fluid (i.e. internal tank structures).

These and other objectives will become apparent in light of the present specification, claims, and drawings appended hereto.

SUMMARY OF THE INVENTION

The present invention is directed to a method for acquiring the position of at least one object. The method includes the steps of (a) providing a sampling window; (b) obtaining an echo; (c) repeating the foregoing step of obtaining an echo a predetermined number of times; (d) determining which of the at least one echoes received by the receiver comprises a valid echo; and (e) determining if any of the at least one echoes corresponds to a valid target. The step of obtaining an echo comprises the steps of (a) transmitting a pulse at a desired frequency from a transducer; (b) scanning for echoes within the sampling window by a receiver; and (c) receiving at least one echo of the pulse at the receiver which are within the sampling window, the at least one echo having a frequency.

In a preferred embodiment, the step of determining a valid echo comprises the steps of (a) establishing a threshold amplitude; (b) storing portions of each of the at least one received echo which are outside of the threshold amplitude; (c) correlating the frequency of the received at least one echo to the frequency of the respective pulse; and (d) storing the at least one echo if the frequency of the received at least one echo substantially corresponds to the frequency of the respective pulse as a possible target echo.

In one such embodiment, the step of obtaining an echo further comprises the step of dismissing the at least one echo if the frequency of the received at least one echo does not substantially correspond to the frequency of the respective pulse.

In another such embodiment, the method comprises the step of determining the time of occurrence of the at least one echo determined to be a valid echo. In one such embodiment, the step of occurrence determining comprises the step of interpolating one of a first amplitude maxima and minima with a predetermined later amplitude maxima and minima, to, in turn, determine the temporal occurrence of the at least one echo. In another embodiment, the step of interpolating utilizes the greater of the first amplitude maxima and minima with the greater of the fifth amplitude maxima and minima.

In another embodiment, the step of target determining comprises the steps of (a) comparing each of the at least one valid echoes to each other; (b) grouping echoes which are temporally related into an echo group; and (c) identifying each echo group having a predetermined number of temporally related echoes as a target. In one such embodiment, the predetermined number of related echoes comprises at least seventy percent of the predetermined number of pulses.

In yet another preferred embodiment, the step of providing a sampling window comprises the steps of (a) providing a range within which to acquire a target; and (b) dividing the range into a plurality of sampling windows.

In another aspect of the invention, a method of tracking an object is presented. The method includes the steps of (a) acquiring the position of at least one object; (b) selecting the at least one object as a target; (c) determining a sampling window which envelopes the target; (d) transmitting a pulse at a desired frequency from a transducer; (e) obtaining an echo; (f) scanning for echoes within the sampling window by a receiver; (g) receiving at least one echo of the pulse at the receiver which are within the sampling window, the at least one echo having a predetermined frequency; (h) repeating the foregoing step of obtaining an echo a predetermined number of times; (i) determining valid echoes from the target; (j) calculating the current position of the target from the received echoes; and (k) repeating the steps of obtaining, repeating, determining and calculating as desired.

In another preferred embodiment, the method further comprises the step of providing output to an output device corresponding to the current position of the target.

In one embodiment, the step of acquiring comprises the steps of (a) providing a sampling window; (b) obtaining an echo; (c) repeating the foregoing step of obtaining an echo a predetermined number of times; (d) determining which of the at least one echoes received by the receiver comprises a valid echo; and (e) determining if any of the at least one echoes corresponds to a valid target. The step of obtaining an echo comprising the steps of: (a) transmitting a pulse at a desired frequency from a transducer; (b) scanning for echoes within the sampling window by a receiver; and (c) receiving at least one echo of the pulse at the receiver which are within the sampling window, the at least one echo having a frequency that matches the predetermined frequency.

In one embodiment, the method further comprises the step of reacquiring the position of the at least one object if the step of determining a valid target fails to determine a target. In one embodiment, the step of reacquiring comprises the steps of: (a) expanding the previously selected sampling window; and (b) reexecuting the step of repeating with the expanded sampling window.

In another preferred embodiment, the method further comprises the steps of (a) comparing the current position of the target relative to the position of the target during a prior obtained calculation; (b) determining a direction of movement for the target; and (c) expanding the sampling window in the direction of movement. In one such embodiment, the method further comprises the step of contracting the sampling window in the direction opposite of the movement.

In yet another preferred embodiment, the step of selecting comprises the step of automatically selecting the object closest to a predetermined point.

In a preferred embodiment, the step of selecting comprises the steps of (a) outputting parameters corresponding to the various acquired objects to the output device; and (b) inputting the desired object to be tracked by way of the input device.

BRIEF DESCRIPTION OF THE DRAWINGS

The invention will now be described with reference to the drawings wherein.

DETAILED DESCRIPTION OF THE INVENTION

Figure 1:
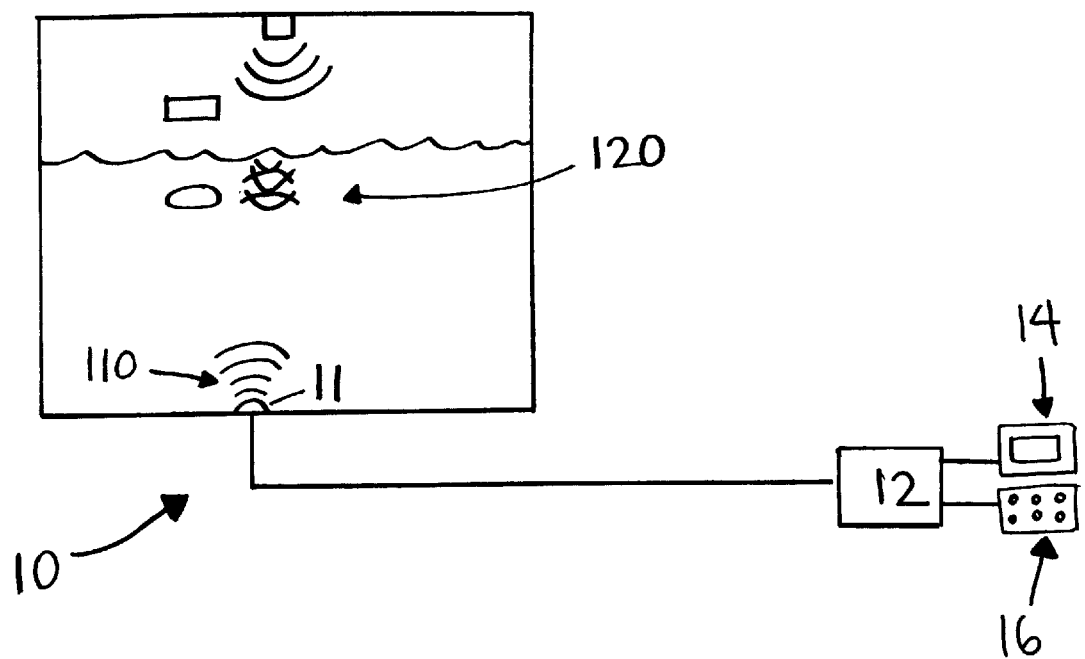
FIG. 1 of the drawings is a side elevational view of a tank having a transducer positioned therein which is programmed to operate pursuant to a method of the present invention.

While this invention is susceptible of embodiment in many different forms, there is shown in the drawings and will be described in detail, one specific embodiment with the understanding that the present disclosure is to be considered as an exemplification of the principles of the invention and is not intended to limit the invention to the embodiment illustrated.

A method of tracking an object (i.e. a target) is disclosed which generally comprises a series of steps, including the steps of (a) acquiring the position of at least one object; (b) selecting the at least one object as a target; (c) determining a sampling window which envelopes the target; (d) transmitting a pulse at a desired frequency from a transducer; (e) obtaining an echo; (f) scanning for echoes within the sampling window by a receiver; and (g) receiving at least one echo of the pulse at the receiver which are within the sampling window, the at least one echo having a predetermined frequency; (h) repeating the foregoing step of obtaining an echo a predetermined number of times; (i) determining valid echoes from the target; (j) calculating the current position of the target from the received echoes; (k) repeating the steps of obtaining, repeating, determining, and calculating as desired; and (l) providing output corresponding to the calculated position.

Such a method will be described below with the understanding that it may have a plurality of uses. Indeed, while various uses are contemplated, the method is rather suitable for use in association with a fuel tank, to, in turn, accurately measure the fuel within the tank. Such accurate measurements are rather useful and important for, for example, racing cars and pit crews.

A system capable of executing the foregoing method is shown in FIG. 1 and the system is identified generally as 10. More specifically, system 10 comprises ultrasonic transducer 11 associated with hardware 12 (i.e. proper IC base circuitry equipped with software), output device 14, and input device 16. Transducer 11 is capable of transmitting and receiving signals having a pulse width and an amplitude. Hardware 12 is capable of directing transducer 11 to transmit particular pulses, and to process information received by input device 16 and transducer 11, toward eventual display to output device 14. Output device 14 may comprise a monitor, printer, an analog and/or digital gauge, among others. Input device 16 may comprise a keyboard (specialized or conventional), keypad, and/or a series of toggle switches, among others. Of course, it will be understood that the invention described herein is not limited to any particular IC based circuitry, software, output device and/or input device.

To operate system 10, system 10 is first activated. Generally, system 10 will first undergo a system diagnostic operation. If a failure condition is detected with any of the system diagnostics (i.e. faulty transducer, other hardware failure or software glitch) an output is directed to output device 14 to alert the operator that a failure condition has been detected. In certain embodiments, the failure detection may be enhanced such that the output directed to output device 14 identifies not only a failure condition but the particular component or subcomponent that is the cause of the failure condition. Of course, other embodiments will omit entirely a system diagnostic operation.

Upon successful diagnostic testing, system 10 is prepared to acquire a target. In certain embodiments, the acquiring process is initiated by first searching to see if a previous target position has been stored in the system for a previous operation. For example, if system 10 had previously been used to track the level of fuel in a tank, system 10 can retain this information so that during subsequent operations, system 10 will have a smaller sampling window in which to execute the below described target/object position acquisition procedure. If no such prior position is stored in system 10, then system 10 will assign a default sampling window which, for example, encompasses the entire possible range for the target. For example, where the target is the surface of fuel or other fluid in a tank, where no previous range exists in the system, system 10 will assign a default total sampling window which extends from the approximate base of the tank to the upper end of the tank.

After determining a total sampling window of search, system 10 first divides the entire range into a plurality of sampling windows, such that each sampling window is searched sequentially to identify targets within each of the sampling windows. For example, and certainly not so as to be limited thereto, the contemplated total sampling window in the present invention is divided into three sampling windows. The range division facilitates the accurate and quick acquisition of possible objects which may comprise desired targets for tracking. In particular, as the sampling window extends further and further away from transducer 11, the pulse width, amplitude, and gain are increased so as to maximize signal to noise ratios. At shorter distances, the pulse width, amplitude, and gain are reduced to minimize false echoes which can occur at generally closer ranges. Additionally, as will be explained, system 10 tracks the echo width, the noise, the echo amplitude, among other readings which are fed back into system 10 to fine tune the pulse width, amplitude, and amplifier gain of transducer 11.

Each sampling window is sampled a preset desired quantity of times. In the contemplated system, transducer 11 is directed by hardware 12 to execute ten samples. Sampling ten times provides a more accurate target acquisition procedure. Indeed, by limiting the sampling window, it is possible to execute the foregoing sampling in a temporally efficient manner.

For each sampling, the waveform is transmitted by transducer 11. Presumably, as shown in FIG. 1, at least a portion of pulse 110 is reflected (i.e, echo 120) from the upper surface of the fluid. Echo 120 is received by transducer 11 for filtering and processing. Once processed, any points that are above predetermined "noise threshold" levels are stored in the system. One such received pulse is shown graphically in FIG. 2. The positive and negative peaks of the acquired points that are outside the threshold levels are compared relative to each other to determine if the frequency is within a narrow band that corresponds to the outgoing signal. If the frequency is within a narrow band that corresponds to the outgoing signal, then the received waveform is deemed an echo. System 10 continues to receive and store the waveform until the waveform subsides and no further points outside of the threshold levels are received. The time from the first to the last point is determined and stored as the echo width. This echo width can be used in a feedback mechanism to facilitate calculation of the sample window duration, outgoing pulse width, pulse amplitude, and amplifier gain settings, and, for varying sampling windows.

Figure 2:
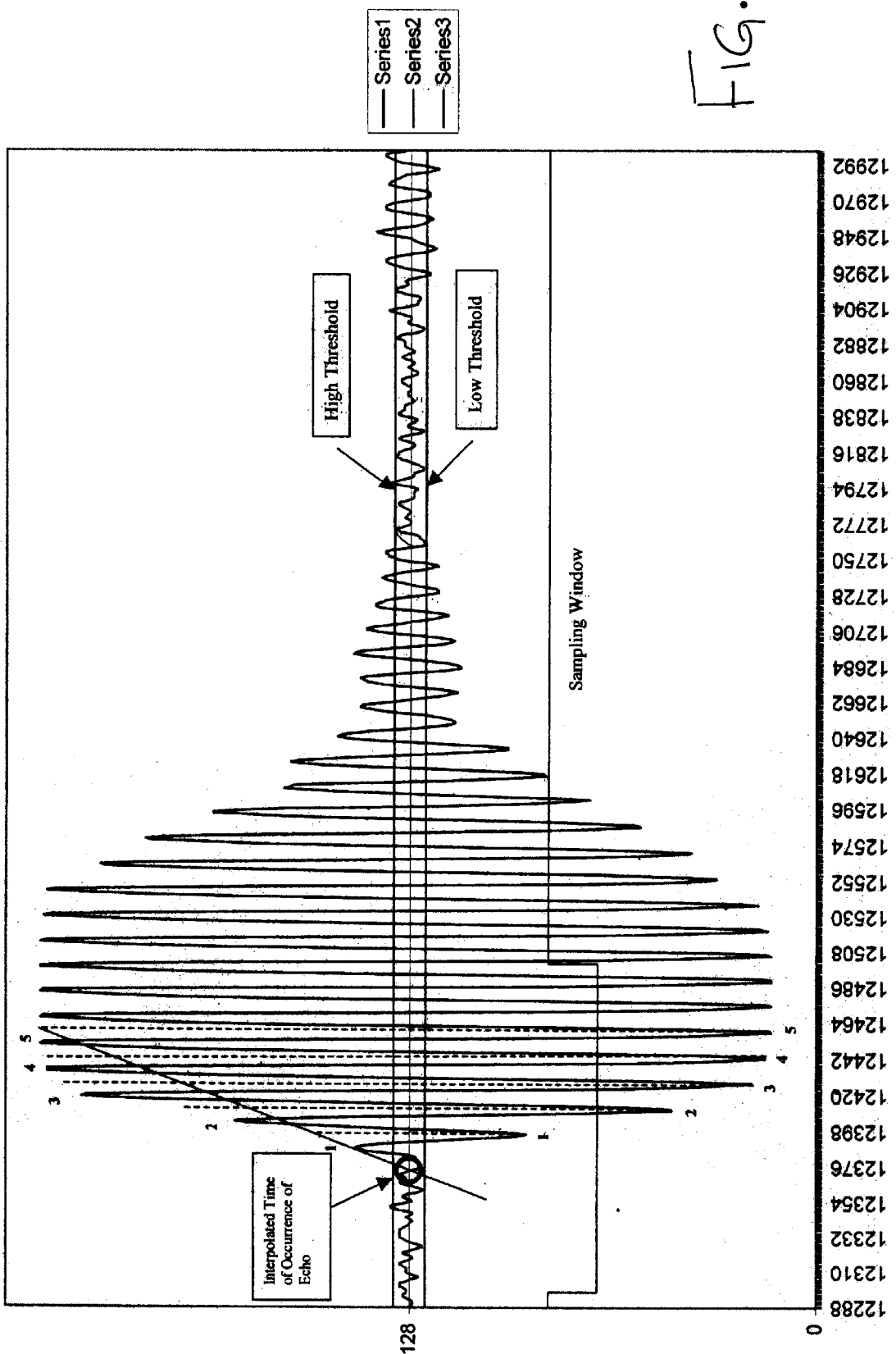
FIG. 2 of the drawings is a graphical representation of a received echo from a potential target.

As shown graphically in FIG. 2, to determine the actual time of echo 120, system 10 identifies the points which correspond to, for example the first five maxima and minima. Once this has been established, the values are interpolated to determine the leading edge. In other embodiments, a different quantity of minima and maxima can be utilized to facilitate the determination of the time of occurrence of the echo. Using such a system to determine echo time of occurrence leads to increased accuracy over systems which utilize the peak amplitude as the echo occurrence.

In addition to determining peaks, system 10 likewise tracks noise (or other interference). If system 10 detects excess noise, then system 10 can deem the particular sample tainted and unusable. One manner in which to track noise is to detect points which are deemed to be unrelated to the determined echo (i.e. points which exceed the threshold levels but do not correspond in frequency). If the number of points that exceed the threshold levels which are deemed to not be related to the determined echo exceeds a predetermined level (for example, the quantity of such points exceeds ten for a particular echo), then system 10 rejects the previously determined echo as being possibly tainted due to excessive noise. System 10 further tracks the noise level and from this data determines an average noise level. The average noise level is used in the feedback portion of the system and can aid in the determination of the pulse width, amplitude, and gain for future samplings.

System 10 repeats the sampling process and continues to receive signals within the particular sampling window. For each received signal, a determination is made as to whether the received signal comprises an echo. If the received signal is determined to be a valid echo, the echo is compared with previous echoes. If the echo time of occurrence substantially matches the relative time of previously determined echoes, or a time multiple of any one of the previously determined echoes, then system 10 recognizes that the two echoes represent the same target. However, if the different determined echoes do not have such a relative time relationship, then each determined echo is stored as representative of a separate target.

Once each of the sampling windows have been sampled a predetermined number of times (i.e. ten times or more, while not limited thereto), and the signals that have been determined to be valid echoes have been stored, system 10 is prepared to analyze these echoes. In particular, the echoes are placed in order by time between the respective transmission of the pulse and the receipt of the echo (and echoes which correspond temporally are grouped into an echo group). It will be understood that repeated sampling during the acquisition process should yield an echo at substantially the same time during each sampling. For example, if ten samplings are taken, a given target should have produced an echo to transducer 11 for a majority of the samplings at approximately the same time. Thus, to determine if the stored echoes are valid, system 10 checks each echo to determine if any other echoes were received within a narrow predetermined time band of the echo under consideration. If any echo group has, for example, fewer than ten or another predetermined number, then the echo group is dismissed as being noise or other interference as opposed to possibly corresponding to a target or group. Of course, system 10 can be modified to be more or less inclusive, (i.e. echoes that did not occur during each sampling can be dismissed, or echoes that occurred in less than a predetermined number of samples can be dismissed). This is repeated for each of the received echoes. After such a comparative analysis, the echoes that remain are designated as objects, and comprise potentially valid targets that have been acquired during the acquisition process.

If no objects (possible targets) have been acquired, it is possible that the targets were moving at such a rate that the acquiring process is unable to deem any one of the echoes as representative of a valid target. In such an instance, system 10 can alert the user to take steps to stabilize the potential targets before attempting to proceed with the steps related to acquiring the target.

Once the potentially valid targets have been identified, system 10 can follow two different selection procedures, namely an auto target select method or a manual select process. In the auto target select mode, system 10 automatically selects the desired target to track from the determined potentially valid targets. For example, this can be accomplished by identifying the target which was the first valid target found (i.e. the echo with the earliest time of occurrence). In the manual select mode, system 10 provides the operator (through the output device) identification of all of the potentially valid targets. The operator then selects which, if any, of the valid targets the operator wishes to track.

In either mode, once the target has been identified, system 10 proceeds to lock onto this target and to track this target. To lock onto the selected target, the sampling window is first set to a time period which envelopes the time of the echo, the time period extends beyond the time of the actual echo (both before and after) a predetermined time period. For example, if the echo was received after 10 ms, the window may be set to extend from 9 ms to 11 ms. The size of the window depends on the quantity of contemplated movement of the target as well as the type of material that is measured, among other issues. System 10 likewise fine tunes the pulse width, amplitude, and amplifier gain parameters for use during tracking (all of which are based on the amplitude of the locked echo waveform).

To track the target that has been selected for tracking, system 10 directs transducer 11 to generate a pulse. The echo that is returned during the time period which is encompassed by the sampling window is then amplified, filtered, and digitized, then followed by a peak-finding procedure identified above. Once received, the echo is compared to the echo received during tracking. If the echoes correspond temporally to a predetermined valid time separation, the new occurrence is then stored and the process is repeated for a predetermined period of samples (i.e. ten samples, twenty samples, etc). Also, the amplitude of the echo from the most recent sampling is used in the feedback mechanism to calculate pulse width and amplitude and gain settings.

If the echo is compared to the echo received during tracking and the echoes do not correspond to a particular valid time separation, then the new echo must be analyzed to determine the cause of the time separation. For example, the target may have been displaced or an obstruction may have entered the path which has obstructed the actual target. For example, the echo may be greater than the maxima of the predetermined window. System 10, in turn, first reviews as to whether previous signals showed a trend of movement that would be consistent with the echo being greater than the maxima. If the previous signals did show such a trend, then the new echo is deemed a valid echo. On the other hand, if the previous sampled echoes showed an opposite trend (i.e. an obstruction), then system 10 will track the alternate echo and continue the sampling procedure until an echo is received that did correspond to the previous established trend. At such time that an echo is sampled that does correspond to the previous trend, then the echo is deemed a valid echo. The tracking and storing of echoes until a valid echo is determined can continue as long as obstructions block the target. As such, in certain circumstances, system 10 will track multiple echoes (i.e. greater than one echo, such as two, three, four or more) simultaneously until the valid echo is determined. As such, the target is not only tracked, it is not lost in the event that multiple obstructions are present. In addition, if trends upward or downward are detected, then the system will reset the sampling window maxima and minima accordingly so that the sampling window accurately corresponds to the window in which the appropriate echo is to be received. For example, an obstruction would be between the sensor and the target. The target then moves towards the sensor and the obstruction until the target overlaps the obstruction. Finally, the target moves away from the obstruction, either toward or away from the sensor. The invention facilitates the detection and tracking and discerning of the target even with the presence of the obstruction.

As with the acquiring step, the tracking procedure executes the foregoing tracking sampling procedure multiples of times to insure accurate tracking (i.e. ten samples). System 10 can utilize statistical functions to minimize errors which can occur from outside disturbances such as, for example, turbulence or temperature variations in the medium. Once the signals are statistically improved, they are converted into operator readable measurements and output is provided to the user. Once completed, system 10 will check if any particular output type is requested or if a new target for tracking is desired. For example, where two fluids that do not mix are contained within a container, system 10 can be changed to track the interface between the two fluids or on the top surface of the upper fluid. If no particular output type is requested and if no new target is selected, then the tracking procedure is repeated with system 10 taking the necessary samples.

If at any time the target being tracked becomes lost, system 10 will continue to sample for a predetermined number of cycles in an attempt to locate the target. If the target cannot be located within a predetermined number of cycles, system 10 can enter into a quick acquire mode. The quick acquire mode differs from the steps associated with the above-identified acquire mode in that the quick acquire mode designates a particular window for sampling that is expanded over the narrow tracking window but which is less than the various sampling windows used during a full acquire procedure identified above. As such, if a target is lost, system 10 can quickly sample from an appropriately sized sampling window to reacquire the target. It will be understood that if the target cannot be relocated, then it may become necessary to execute a full acquiring step.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A method for acquiring the position of at least one object within an overall detection range, comprising the steps of:
   providing at least one sampling window, the sampling window corresponding to a portion of the detection range;
   obtaining an echo comprising the steps of:
      transmitting a pulse at a desired frequency from a transducer;
      scanning for echoes within the sampling window by a receiver; and
      receiving at least one echo of the pulse at the receiver which are within the sampling window, the at least one echo having a frequency that matches the frequency of the outgoing pulse;
   repeating the foregoing step of obtaining an echo a predetermined number of times within the sampling window;
   determining which of the at least one echoes received by the receiver comprises a valid echo, wherein a valid echo comprises an echo having a plurality of successive waveform minima and maxima which are determined by obtaining values within the at least one echo which exceed a predetermined threshold value;
   determining if any of the at least one echoes occurred in substantially the same position for a majority of the predetermined number of times within the sampling window; and
   designating each such determined at least one echoes as corresponding to a valid target.

2. The method of claim 1, further comprising the step of:
   determining the time of occurrence of the at least one echo determined to be a valid echo.

3. The method of claim 2, wherein the step of time of occurrence determining comprises the step of:
   interpolating one of a first amplitude maxima and minima with a predetermined later amplitude maxima and minima, to, in turn, determine the temporal occurrence of the at least one echo.

4. The method of claim 3, wherein the step of interpolating utilizes the greater of the first amplitude maxima and minima with the greater of the fifth amplitude maxima and minima.

5. The method of claim 1, wherein the predetermined number of times comprises ten times.

6. The method of claim 1, wherein the step of providing a sampling window comprises the steps of:
   providing a range within which to acquire a target; and
   dividing the range into a plurality of sampling windows.

7. A method of tracking an object comprising the steps of:
   acquiring the position of at least one object;
   selecting the at least one object as a target;
   determining a sampling window which envelopes the target, wherein the sampling window extends on either side of the previously acquired position of the target;
   obtaining an echo comprising the steps of:

transmitting a pulse at a desired frequency from a transducer;

scanning for echoes within the sampling window by a receiver; and receiving at least one echo of the pulse at the receiver which are within the sampling window the at least one echo having a frequency that matches the outgoing pulse frequency;

repeating the foregoing step of obtaining an echo a predetermined number of times;

determining valid echoes from the target, wherein a valid echo candidate comprises an echo having a plurality of successive waveform minima and maxima which are determined by obtaining values within the at least one echo which exceed a predetermined threshold value; and a valid echo comprises the valid echo candidates which occurred within a predetermined region for a majority of the predetermined number of times within the sampling window; and calculating the current position of the target from the received echoes that have been validated; and repeating the steps of obtaining, repeating, determining and calculating as desired.

8. The method of claim 7, wherein the predetermined number of times comprises ten times.

9. The method of claim 7, further comprising the step of:

providing output to an output device corresponding to the current position of the target.

10. The method of claim 7, wherein the step of acquiring comprises the steps of:

providing a sampling window;

obtaining an echo comprising the steps of:

transmitting a pulse at a desired frequency from a transducer;

scanning for echoes within the sampling window by a receiver; and receiving at least one echo of the pulse at the receiver which are within the sampling window, the at least one echo having a frequency that matches the outgoing pulse frequency;

repeating the foregoing step of obtaining an echo a predetermined number of times;

determining which of the at least one echoes received by the receiver comprises a valid echo; and determining if any of the at least one echoes corresponds to a valid target.

11. The method of claim 7, further comprising the step of:

reacquiring the position of the at least one object if the step of determining a valid target fails to determine a target.

12. The method of claim 11, wherein the step of reacquiring comprises the steps of:

expanding the previously selected sampling window; and reexecuting the step of repeating with the expanded sampling window.

13. The method of claim 7, further comprising the steps of:

comparing the current position of the target relative to the position of the target during a prior obtained calculation;

determining a direction of movement for the target; and expanding the sampling window in the direction of movement.

14. The method according to claim 13, further comprising the step of:

contracting the sampling window in the direction opposite of the movement.

15. The method according to claim 7, wherein the step of selecting comprises the step of:

automatically selecting the object closest to a predetermined point.

16. The method according to claim 7, wherein the step of selecting comprises the steps of:

outputting parameters corresponding to the various acquired objects to the output device; and inputting the desired object to be tracked by way of the input device.

* * * * *